3,373,121
POLYEPOXIDE FOAM

Billy E. Burgert and William G. Moore, Midland, Mich., assignors to The Dow Chemical Company, Midland, Mich., a corporation of Delaware
No Drawing. Filed Feb. 12, 1962, Ser. No. 172,799
10 Claims. (Cl. 260—2.5)

The invention relates to an improved resinous solid cellular foam. It more particularly relates to the porous cross-linked reaction product of a diglycidyl compound and a polyalcohol.

Solid cellular foams are known. They compose a large class of materials widely used for cushioning and insulating and for the construction of articles, panels, and furnishings in general. The suitability of a foam for a particular use is largely dependent on such properties as tear resistance, flexibility, resiliency, resistance to oxidative effects, and its cell structure, e.g., whether it is of closed structure or of connecting or open cell structure.

(a) 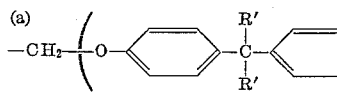

The general procedure followed in making a foam is to cause a gas to be either generated in situ or to be introduced into a rubber or resinous material in a liquid but curable state. The gas may be generated in situ either by chemical reaction or by application of heat. When introduced, it is usually admitted under pressure through a plurality of relatively small apertures into a confined mass of the resinous or rubber liquid. The rate of generation or introduction of the gas is controlled so that at least a portion of the gas is at least temporarily trapped in the expanding curing mass. Materials presently employed in making foam include polymeric materials of high molecular weight such as natural and synthetic rubber and polystyrene and polymerizable systems such as diisocyanate-polyglycol mixtures.

Many known resinous solid foams are not fully satisfactory. For example: if they are sufficiently tough, they are often too rigid; if they are sufficiently resilient, they often become more-or-less permanently set or compressed after a period of continuous load bearing; if they are subjected to prolonged contact with air, particularly in the presence of light, they often become tacky or softened, or become brittle and even crumble away in a gradual disintegrating process.

Efforts have been made to provide a solid foam which overcomes some of the above disadvantages by employing a diglycidyl ether, e.g., admixing a diglycidyl ether of a bisphenol with the reaction product of a polyamide resin and N,N'-dinitroso-N,N'-dimethyl terephthalamide, wherein nitrogen gas is liberated in situ as in U.S. Patent 2,936,294 or admixing a liquid or solid readily convertible to a gas by heat, with a diglycidyl ether of a bisphenol, heating said mixture for a prescribed time and then admixing therewith an amine type curing agent, and heating an additional period as in U.S. Patent 2,739,134. Foams of this nature have limited utility and do not have the desirable properties for a number of uses requiring solid foam.

A need exists for a cellular solid foam which is conveniently prepared and which possesses a composite of properties such as increased toughness, unimpaired resiliency over a wide range of temperatures, uniformity of cell structure, especially good chemical resistance and electrical properties, and long life in service under conditions of continued stress and subjection to the degenerative effects of air and light.

The invention provides a foam which meets this need. The manufacture thereof does not require highly specialized equipment and does not use hazardous or obnoxious materials. It is resilient, possesses good tear resistance, and is durable, has low thermal and electrical conductive properties, and is long lived in use in the presence of oxygen and moisture.

The foam of the invention consists essentially of the reaction product of: (A) and (B), in the presence of (C) and (D) below, where:

(A) is a diglycidyl compound selected from the class consisting of:

(1) 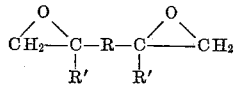

wherein R' is a substituent selected from the class consisting of H, CH$_3$, and C$_2$H$_5$, and R is selected from the class having the formula:

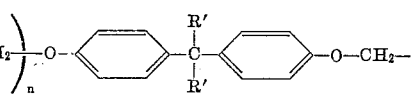

wherein R' has the same significance as above; and $n$ is from 0 to 10;

(b) $(CH_2)_m$, wherein $m$ is from 4 to 18; and (c) 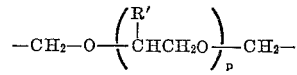

wherein $p$ is from 1 to 15 and R' has the same significance as above, viz., represents H, CH$_3$, or C$_2$H$_5$;

(2) a mixture of diglycidyl compounds selected from those set out above;

(B) is a polyfunctional alcohol;
(C) is a Friedel-Crafts catalyst; and
(D) is an expanding gas or blowing agent.

The term, diglycidyl compound, is a compound having between about 1.6 and 2 terminal glycidyl groups per molecule and includes ethers, polyethers and diepoxides terminating in

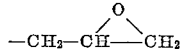

generally. The term, polyalcohol, means an aliphatic alcohol having an hydroxyl functionality of about two or more, i.e., it includes difunctional, trifunctional, and higher alcohols. Illustrative of polyalcohols are the glycols, glycerol, pentaerythritol, mono-ethers of pentaerythritol and of glycerol, and glycerol and glycols with hydroxy-alkoxyalkoxy substitution on carbon. The hydroxyl groups of the polyalcohol may be primary or secondary but may not be tertiary.

The term, diglycidyl compound, as used herein, includes those having somewhat less than two oxirane groups per molecule, e.g., those having an average of from 1.6 to 2 oxirane groups per molecule.

When the polyalcohol employed has an average hydroxyl functionality of more than two, the amount of the diglycidyl compound to employ need not be greater than that necessary to provide an equivalent number of oxirane groups per equivalent number of hydroxyl groups in the polyalcohol to obtain a relatively low density foam. On the other hand, when the polyalcohol employed is a diol, the amount of the diglycidyl compound to employ to obtain a relatively light density foam is greater than that necessary to provide an equivalent number of oxirane groups per equivalent number of hydroxyl groups in the polyalcohol.

The reaction thought to take place when a diglycidyl compound and a diol are reacted in amounts which provide an excess of oxirane groups over hydroxyl groups in the diol may be represented as follows:

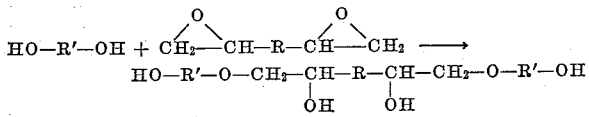

R′ is an alkylene or alkyleneoxy group and R is an isoalkylidene or diphenyloxy residue or R′. Excess oxirane groups from unreacted diglycidyl compound present then react with the polyfunctional alcohol formed to produce a cross-linked polymer. A two-step procedure described hereinafter offers some advantages over the above one-step procedure in that the prepolymer prepared in the first of the two steps may be stored for long periods of time and converted to a foam at a convenient later date. It also provides better control over the density of the foam being made.

For the purposes of ascertaining suitable proportions of the diglycidyl compound and a suitable polyalcohol to employ, an unblown sample mixture may be made by admixing the selected diglycidyl compound and polyalcohol with about 2 to 5 percent by weight of a suitable Friedel-Crafts catalyst, e.g., a 48% solution of $BF_3$ in diethyl ether, in the absence of a blowing agent. If a tough product is obtained within about 3 minutes, the proportions employed are satisfactory for use in making the foam of the invention. The recommended amounts of the diglycidyl compound and polyalcohol to employ are those sufficient to provide a ratio of between about 1.5 and 3.0 equivalents of oxirane groups per hydroxyl group of the polyalcohol, a ratio of between about 2.0 and 2.5 oxirane groups to one hydroxyl group usually being provided. Illustrative of a standard mixture to employ for comparative purposes is one consisting of an admixture of 110 millimole equivalents of a product, having the structure below and the average composition corresponding to $n=12.6$:

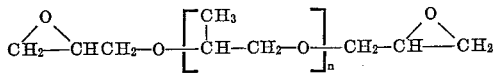

14 millimoles of glycerine, and 10 millimoles of a product, having the structure below and the average composition corresponding to $n=34$:

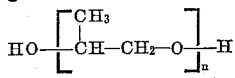

The catalyst to employ in the practice of the invention may be any Friedel-Crafts or Lewis acid type catalyst, e.g., $BF_3$, $SnCl_4$, $SbCl_5$, $AlCl_3$, and amine and ether complexes thereof.

Blowing agents which may be employed are any substantially chemically inert liquid or solid which can be completely readily dispersed in the reaction mixture and which is readily converted to a gas at a controllable rate upon the application of heat. It is recommended that the blowing agents have a boiling point of less than about 100° C. and preferably below 60° C. Examples of suitable blowing agents are the Freons, low boiling hydrocarbons such as butane and pentane, and halogen-substituted derivatives of hydrocarbons.

The preferred blowing agent to employ is a chlorofluoro ethane, e.g., $CClF_2$-$CClF_2$ and $CF_2Cl$-$CFCl_2$ or chlorofluoro methane, e.g., $CFCl_3$ having a boiling point between 0° C. and 60° C., or a mixture boiling in this range.

The amount of the catalyst to employ is between 1 and 5 percent by weight of the diglycidyl compound and polyalcohol reaction mixture. The blowing agent is usually added as a liquid and accordingly is employed at a temperature below the boiling point thereof. The reaction between the diglycidyl compound and polyalcohol is exothermic and the blowing agent is readily volatilized, producing cellular voids in the reaction mixture and converting it into an intumescent structure simultaneously as the cure proceeds. A few drops of an unreactive liquid which is incompatible with the reaction mixture, e.g., a silicone, is usually admixed therewith prior to admixture of the Friedel-Crafts catalyst to provide an open cell structure among such unreactive silicones are polymers of dimethyl siloxanes. When used, they are usually employed in the amount of between about 0.1% and 5.0%, by weight, of the composition.

The invention may be practiced by one of two modes of procedure. One mode is a one-step procedure which consists of admixing the polyalcohol and diglycidyl compound together and admixing therewith a Friedel-Crafts or Lewis type acid and a blowing agent.

The preferred mode of practicing the invention is to carry it out in two steps, as follows:

Step 1.—Admix (1) a diglycidyl ether of a polyalcohol or mixture of such ethers (2) a polyalcohol, e.g., polyoxypropylene glycol, in amounts so as to provide a stoichiometric excess of the polyalcohol and (3) a small amount of a Friedel-Crafts catalyst or complex thereof, e.g., $BF_3:(C_2H_5)_2O$, in a reaction vessel equipped with a stirrer, heat-control means and thermometer or thermocouple. The mixture so made may be warmed to initiate reaction, if necessary, to between about 40° and 50° C. and thereafter controlled at a temperature between about 60° and 70° C. until the reaction has progressed sufficiently for it to have a viscosity of between about 4,000 and 20,000 centipoises.

Step 2.—The reaction mixture of Step 1 (usually after cooling to between about 20° and 40° C.) is admixed with more of a diglycidyl compound to provide the desired excess thereof, a Friedel-Crafts catalyst, e.g., additional $BF_3:(C_2H_5)_2O$, usually between about 1 and 5 weight percent based on the weight of the reaction mixture, and a blowing agent, e.g., between about 10 and 30 percent of a Freon. Usually between about 1% and 5% of a silicone is admixed therewith to promote an open cell structure. The mixture reacts and simultaneously expands into a cellular solid foam having a density of between about 1 and 10 pounds per cubic foot.

In practicing the invention, it is often advantageous to employ as low a ratio of the more expensive diglycidyl ether to the less expensive polyalcohol as will yield a satisfactory foam. To attain this objective, a high molecular weight polyalcohol is usually employed. One of such alcohols which is highly satisfactory is the condensation product obtained by reacting propylene oxide with glycerol. A triol is thus produced which usually has a molecular weight of between about 2,000 and 5,000 and preferably not over about 3,500, e.g., 3,000. Accordingly, although a molar excess of the diglycidyl compound is employed with the polyol, the ratio by weight of the polyalcohol is greatly in excess of that of the diglycidyl ether.

A further modification of the practice of the invention is to employ as the polyalcohol a mixture of polyoxypropylene glycol, having a relatively high molecular weight of between about 1,000 and 2,500, e.g., about 2,000, and one having a relatively low molecular weight such as glycerol, in an amount sufficient to provide between about 5 and 10 percent by weight of the resulting glycerol-polyoxypropylene glycol mixture. The objective of employing a preponderance by weight of the polyalcohol over the diglycidyl compound and yet provide a molar excess of oxirane groups is, therefore, attained similarly to employing the condensation product of an alkylene oxide and glycerol as explained above. The preferred polyalcohol recommended is one having 3 or more hydroxyl groups per molecule and one having an hydroxyl equivalent weight of between about 500 and about 1000. (By hydroxyl equivalent weight is meant the weight of the polyalcohol necessary to provide one equivalent weight of hydroxyl groups.) It is also recommended that, when the polyalcohol employed has a carbon-to-oxygen ratio of less than 3, the diglycidyl ether employed be water-insoluble and be used in an amount sufficient to provide at least about 50% by weight of the composition. Unless such diglycidyl ether is used in such amount, the resulting foamed product may be undesirably water-sensitive. On the other hand, when such diglycidyl ether is thus used in a preponderant proportion, diethylene glycol may be employed as the polyalcohol in the practice of the invention to produce a satisfactory foam.

The following examples are set out for purposes of illustrating the practice of the invention but are not to be construed as limiting, the scope of the invention being that described hereinbefore and as defined in the appended claims.

EXAMPLES 1–3

These examples illustrate the one-step procedure aforedescribed. The selected polyalcohol, diglycidyl ether, Friedel-Crafts catalyst, and blowing agent were admixed in a suitable vessel equipped with mixing, heating, cooling, and temperature-recording means. The diglycidyl compound employed was the diglycidyl ether of isopropylidene diphenol. The catalyst employed was a 48% by weight solution of $BF_3$ in diethyl ether.

The amounts in grams, the molecular ratios, and equivalent ratios of the polyalcohol and diglycidyl ether employed, the amount in grams of catalysts employed, and the amount in milliliters of Freon employed, as well as the density of the resulting foam, are set out in Table I below:

Dow Corning silicone No. 200 (which had a viscosity of about 20 centistokes) is illustrative, about 0.5 milliliter of $BF_3:(C_2H_5)_2O$, and 4.3 grams of 1,1,2 - trichloro - 1,2,2-trifluoro ethane, a high-boiling Freon. A fine-textured open cell foam was formed.

EXAMPLE 5

*Step 1.*—Example 4 was repeated except that the prepolymer was prepared by admixing 3200 grams of polyoxypropylene glycol, having a molecular weight of 2000, and 557 grams of the diglycidyl ether mixture employed above, and thereafter admixing an additional 2000 g. of the polyoxypropylene glycol having previously admixed therewith 5 milliliters of $BF_3:(C_2H_5)_2O$. The resulting mixture was heated to 75° C. which thereafter, due to exothermic heat, rose to 85° C. and was then cooled to the ambient temperature. Titration showed that over 90% of the oxirane groups present had reacted.

*Step 2.*—A mixture of 15.26 grams of the prepolymer so formed, 3.3 grams of the diglycidyl ether employed above, and 2 drops of Dow Corning silicone No. 200 (viscosity of 50 centistokes) was prepared. Freon 113 (10 milliliters) and 100 drops (about 5 milliliters) of a 4.8% solution (of a 48% solution of $BF_3$ in diethyl ether) in dioxane were admixed therewith. Within about 30 seconds the mixture had foamed into a tough, highly resilient foam having a density of 8 pounds per cubic foot.

EXAMPLE 6

To show the effect of employing other Friedel-Crafts catalysts than $BF_3$, the unblown sample test, set out here-

TABLE I

| Example No. | Name | Amount in grams | Milligram moles | Milli-equivalents of hydroxyl groups | Diglycidyl Ether of Isopropylidenediphenol | | | Freon 113 [1] in ml. | $BF_3$ etherate added | Density of foam in lb./cu. ft. |
|---|---|---|---|---|---|---|---|---|---|---|
| | | | | | Amount in grams | Milligram moles | Milli-equivalents of epoxide | | | |
| 1 | Polyoxypropylene diol (mol wt. of 2,000) mixed with glycerol. | 5.0 / 1.25 | 2.5 / 13.6 | 5 / 40.8 | 9.5 | 28 | 56 | [2] 1.25 | 1 gram | 5.5 |
| 2 | ___do___ | 10.0 / 0.5 | 13.6 / 5.0 | 10.0 / 10.0 | 9.5 | 28 | 56 | 2.09 | ___do___ | 5.0 |
| 3 | Teracol [3] | 10.0 | 3.3 | 6.6 | 17.4 | 51.2 | 102.4 | 13.0 | ___do___ | 4.0 |

[1] Freon 113 is trichlorotrifluoroethane, i.e., $CCl_3CF_3$.
[2] Added as Freon 113 encapsulated in beads of polystyrene.
[3] A polymerized tetramethylene oxide diol (mol wt. of 3,000).

The foam made by each of the examples set out in Table I was examined and found to be highly resistant to tear, had good compression and modulus, (i.e., it recovered substantially fully and quickly after compression) and was highly useful as a cushioning and/or insulating material.

EXAMPLE 4

This example illustrates the two-step procedure set out hereinabove.

*Step 1.*—A prepolymer was prepared by admixing in a suitable vessel 3436 grams (1.72 mole) of polyoxypropylene glycol having a molecular weight of 2000 and 554 grams (1.64 mole) of the diglycidyl ether, employed in Examples 1 to 3 above, at ambient temperature. This provided a ratio of equivalent weight of the ether to the equivalent weight of the polyalcohol of 0.948. About 0.05 percent of $BF_3$ gas, by weight of the reaction mixture, was passed thereinto. The temperature rose to between 60° and 70° C. and then gradually subsided to ambient temperature. The prepolymer had a viscosity of about 10,000 centipoises.

*Step 2.*—To 7.5 grams of the prepolymer so made were then admixed 0.66 gram (1.94 millimole) of the diglycidyl ether employed in Step 1, 12–14 drops of a polymer of dimethyl siloxane having repeating units of

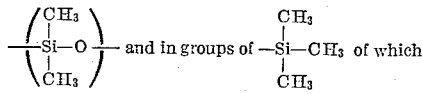

and in groups of $-\underset{\underset{CH_3}{|}}{\overset{\overset{CH_3}{|}}{Si}}-CH_3$ of which inbefore was run, employing the polyalcohol and diglycidyl ether in the proportions employed in Example 1 but, instead of the $BF_3$:etherate, employing a solution of 10 grams $SbCl_5$ dissolved in 40 grams ethyl acetate as the catalyst. This solution was used in the amount of 1 part $SbCl_5$ per 100 parts of polyalcohol and diglycidyl ether. A polymer sheet was cast without blowing agent in order to evaluate the catalyst. The rate of cure and the properties of the polymer sheet prepared employing $BF_3$ and $SbCl_5$ were compared and found to be quite similar in properties.

EXAMPLE 7

Example 6 was repeated except that about 5% of $SnCl_4$ was employed as the Friedel-Crafts catalyst. The mixture gelled in 3 minutes and subsequently cured to a tough polymer having high tear resistance of comparable excellence to the standard reference mixture.

EXAMPLE 8

This example illustrates the practice of the invention employing a diglycidyl ether of a bisphenol and a polyalcohol of greater functionality than 2. A triol (made by reacting glycerol with propylene oxide and having a molecular weight of 3000) was admixed with glycerol in the relative amount of 10 parts of the triol and 1.25 parts of glycerol. There was also admixed therewith about 1 milliliter of a silicone (Carbide and Carbon Silicone L520) to control cell size in the foam, about 0.1 milliliter of a surfactant known as Tween 40 (which is a polyoxyalkylene sorbitan monopalmitate obtained from the Atlas Powder Company) and DER 332 which is the diglycidyl ether of 4,4'-isopropylidenediphenol and having an epoxide equivalent weight of 179. To the mixture so formed were admixed a solution consisting of 1 gram of BF₃-etherate, 5 grams of the above described triol, and 5 grams of Freon 113. Foaming began immediately and was complete within about 10 seconds. The density of the foam was 5 pounds/cu. ft.

Having described our invention, what we claim and desire to protect by Letters Patent is:

1. A cellular resinous solid foam consisting of the reaction product of:
component (A) a diglycidyl compound selected from the class consisting of:
(1) 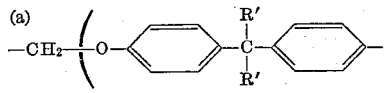

wherein R' is a substituent selected from the class consisting of H, CH₃, and C₂H₅ and R is selected from the class having the formula:

(a) 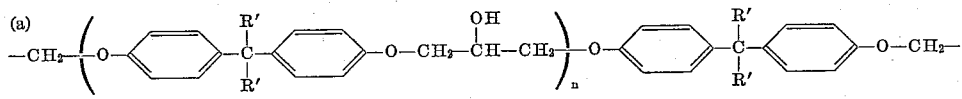

wherein R' has the same significance as in (1) above and $n$ is from 0 to 10;

(b) 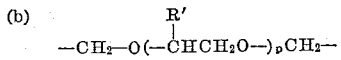

wherein R' has the same significance as in (1) above and $p$ is from 1 to 15;
(2) a mixture of the diglycidyl compounds of (a) and (b), and
component (B) a polyfunctional alcohol selected from the class consisting of (1) polyoxyalkylene glycols, having an average molecular weight of between about 1,000 and about 2,500, (2) reaction products of propylene oxide and glycerol having an average molecular weight of between about 2,000 and about 3,500, and (3) mixtures of the polyoxyalkylene glycols of (1) or the reaction product of (2) or of both (1) and (2) with glycerol in a weight proportion of between about 99 and 90 percent of the polyfunctional alcohol, selected from (1) and (2), and mixtures of both (1) and (2), and between about 1 and about 10 percent of the glycerol to provide a molar ratio of oxirane groups comprising component (A) to hydroxyl groups comprising component (B) of between 1.5 and 3;
(C) a Friedel-Crafts catalyst to effectuate cross-linking of components A and B;
(D) a blowing agent selected from the class consisting of substantially chemically inert gases and inert liquids and solids which yield a substantially chemically inert expanding gas in controlled amounts when dispersed in the reaction mixture upon the application of heat, in an amount sufficient to produce a foamed product of desired density.

2. The cellular resinous solid foam of claim 1 wherein the expanding gas is provided by a liquid, entrapped in solid polystyrene beads, which liquid converts to a gas at moderate increases in temperature.

3. The method of making foamed resinous composition comprising the steps of:
(I) admixing as component (A) a first portion of a glycidyl compound having an average of between 1.6 and 2 vicinal oxirane groups per molecule selected from the class consisting of:

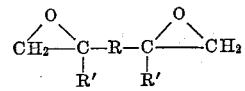

wherein R' is a substituent selected from the class consisting of H, CH₃, and C₂H₅ and R is selected from the class having the formula:

(a) 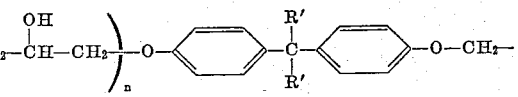

wherein R' has the same significance as in (1) above and $n$ is from 0 to 10;

(b) 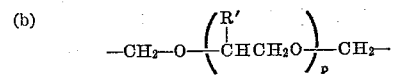

wherein R' has the same significance as in (1) above and $p$ is from 1 to 15;
(2) a mixture of the glycidyl compounds of (a) and (b), and
as component B a polyfunctional alcohol selected from the class consisting of
(1) polyoxyalkylene glycols, having an average molecular weight of between about 1,000 and about 2,500,
(2) reaction products of propylene oxide and glycerol having an average molecular weight of between about 2,000 and about 3,500, and
(3) mixtures of the polyoxyalkylene glycols of (1) or the reaction product of (2) or both (1) and (2) with glycerol in a weight proportion of between about 99 and 90 percent of a polyfunctional alcohol selected from (1), (2), and mixtures of both (1) and (2) and between about 1 and about 10 percent of the glycerol, in an amount of component (B) sufficient to provide a stoichiometric excess of hydroxyl groups over the oxirane groups of component (A);
(II) admixing with the intermixture of components (A) and (B) a first portion of a Friedel-Crafts catalyst as component (C) in an amount sufficient to initiate but insufficient to effectuate complete cross-linking of components (A) and (B);
(III) warming the mixture of (A), (B), and (C), to a temperature of between about 40° C. and about 70° C. until the mixture has a viscosity of between about 4,000 and about 20,000 centipoises, measured at a standard temperature of about 25° C.;
(IV) Cooling the mixture of components (A), (B), and (C) to between about 20° C. and about 40° C.;
(V) Admixing with the so cooled mixture of components (A), (B), and (C)
(1) a final portion of the glycidyl compounds comprising component (A) in an amount sufficient to provide in toto, a molar ratio of oxirane groups to the hydroxyl groups of between about 1.5 and 3,
(2) adding a final portion of said Friedel-Crafts catalyst comprising component (C) in an amount sufficient to effectuate cross-linking of components (A) and (B); and promptly, before cross-linking has appreciably progressed, advising (3) a blowing agent selected from the class consisting of substantially chemically inert gases and liquid and solids yielding inert gases in controlled amounts, when dispersed in the reaction mixture, upon the application of moderate heat, and (VI) Subjecting the composition to a temperature of between about 40° and 70° for a time sufficient to convert the mixture to a fine textured open cell epoxy foamed resin.

4. The cellular resinous solid foam of claim 1 wherein the amounts of (A) and (B) are such as to provide between about 1.5 and 3.0 equivalents of oxirane groups contained in (A) per equivalent of hydroxyl groups contained in (B).

5. The cellular resinous solid foam of claim 1 wherein the diglycidyl compound is a diglycidyl ether of an isoalkylidenediphenol.

6. The cellular resinous solid foam of claim 1 wherein the isoalkylidenediphenol is 4,4'-isopropylidenediphenol.

7. The cellular resinous solid foam of claim 1 wherein the Friedel-Crafts catalyst is employed in an amount between about 1 and 5 percent by weight of the composition.

8. The cellular resinous solid foam of claim 7 wherein the Friedel-Crafts catalyst is $BF_3$.

9. The cellular resinous solid foam of claim 1 wherein the expanding gas is selected from the class consisting of chlorofluoroethanes containing at least two fluorine atoms per molecule and boiling between 0° and 60° C., trichlorofluoromethane, and mixtures thereof.

10. The cellular resinous solid foam of claim 1 wherein the expanding gas is an inert gas-yielding liquid entrapped in solid polystyrene beads.

References Cited
UNITED STATES PATENTS

| | | | |
|---|---|---|---|
| 2,824,083 | 2/1958 | Parry et al. | 260—47 |
| 2,990,396 | 6/1961 | Clark et al. | 260—47 |
| 3,025,249 | 3/1962 | Chen | 260—2.5 |
| 3,051,665 | 8/1962 | Wismer et al. | 260—2.5 |
| 2,959,508 | 11/1960 | Graham et al. | 260—2.5 |
| 3,282,863 | 11/1966 | Carey et al. | 260—2.5 |
| 3,223,654 | 12/1965 | Nickerson et al. | 260—2.5 |

OTHER REFERENCES

Physical Properties, 1957 edition, Carbide and Carbon Chemicals Co.

Rigid Urethane Foams—II, Chemistry and Formulation Elastomer Chem. Co.

MURRAY TILLMAN, *Primary Examiner.*

LEON J. BERCOVITZ, GEO. F. LESMES, *Examiners.*

M. FOELAK, *Assistant Examiner.*